United States Patent
Acs

[11] 3,814,458
[45] June 4, 1974

[54] HEAT AND KINETIC ABSORPTION LINING FOR AIR BAG

[75] Inventor: Steven N. Acs, Sarina, Ontario, Canada

[73] Assignee: Allied Chemical Corporation, New York, N.Y.

[22] Filed: Sept. 10, 1971

[21] Appl. No.: 179,397

[52] U.S. Cl. ...... 280/150 AB, 55/380, 117/138.8 N, 150/2.1
[51] Int. Cl. ........................................... B60r 21/08
[58] Field of Search..... 280/150 AB; 150/1; 55/380; 117/138.8 N

[56] References Cited
UNITED STATES PATENTS

| | | | |
|---|---|---|---|
| 2,646,370 | 7/1953 | Nelson | 244/31 X |
| 3,184,742 | 4/1965 | Cutler | 244/31 X |
| 3,473,824 | 10/1969 | Carey et al. | 280/150 AB |
| 3,552,770 | 1/1971 | Berryman | 280/150 AB |
| 3,596,441 | 8/1971 | Lundahl | 55/380 X |
| 3,632,415 | 1/1972 | Franklin | 117/138.8 N X |
| 3,638,755 | 2/1972 | Sack | 280/150 AB X |
| 3,660,138 | 5/1972 | Gorrell | 117/138.8 N X |

FOREIGN PATENTS OR APPLICATIONS

| | | | |
|---|---|---|---|
| 1,946,607 | 3/1971 | Germany | 280/150 AB |

*Primary Examiner*—David Schonberg
*Assistant Examiner*—John P. Silverstrim
*Attorney, Agent, or Firm*—Jonathan Plaut

[57] ABSTRACT

This invention relates to combined heat and kinetic energy absorption in a passenger restraint system as a result of the use of a barrier contained within the passenger restraint bag. More specifically, this invention relates to the introduction of non-elastic, but independent, heat and kinetic energy absorbing bag or other barrier material within the air bag which is utilized to restrain forward motion of a passenger within a motor vehicle.

2 Claims, 2 Drawing Figures

STEVEN ACS
INVENTOR.

BY:

ATTORNEY.

HEAT AND KINETIC ABSORPTION LINING FOR AIR BAG

BACKGROUND OF THE INVENTION

This invention relates to heat and kinetic energy absorption in a passenger restraint system as a result of the use of an independent expansible barrier contained within and of just less than the same volume when inflated as the passenger restraint bag. More specifically, this invention relates to the introduction of a heat and kinetic energy absorbing expansible, but inelastic, bag made of fiber glass material, in one embodiment, within the air bag which is utilized to restrain forward motion of a passenger within a motor vehicle.

One of the problems in the inflation of passenger restraining air bags by a generated gas, or a combination of generated gas and stored gas, especially in the driver's steering wheel unit where a relatively small bag is involved, is the heat caused by the generation of the gas and its rapid movement into the passenger restraint bag. The level of heat produced may result in temperatures in the bag from 250° to 350°F.

It is, therefore, an object of this invention to provide for the absorption of the heat energy of the gas expanding an air bag restraint system and to dissipate kinetic energy concurrently.

These and other objects and advantages will become more apparent in the context of the following more detailed description of the invention.

DETAILED DESCRIPTION OF THE INVENTION

Generally, according to the invention, heat energy absorbing means is provided within a passenger restraint bag, typically to be found within an automobile. The heat energy absorbing means is in the form of a fiber glass inner expansible, but not stretchable, and low porosity bag, in one embodiment, which is just less than substantially the same volume as the passenger restraint outer bag. This heat energy absorbing inner bag will function to absorb kinetic energy as it expands to take the shape of the concurrently expanding outer bag.

In addition, the heat and kinetic energy absorption of the inner bag provides a redundancy advantage in that if said expansion medium should fail, the inner bag would still function to provide passenger restraint.

The U.S. Pat. No. to Carey et al., 3,473,824 discloses a system with inner barrier and outer bag arrangement for absorption of kinetic energy of the inflating medium. However, in Carey et al., the inner barrier merely unfolds and then bursts or otherwise emits the inflating medium into the outer bag. In U.S. Pat. No. 3,522,770 to Berryman is shown as coated or attached to the inside of the restraining bag, a costly process which does not provide for the concurrent kinetic energy absorption and redundancy advantages previously mentioned.

Figure 1:
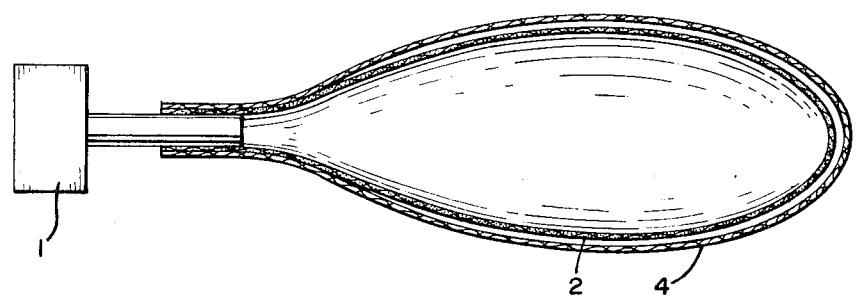
Figure 2:
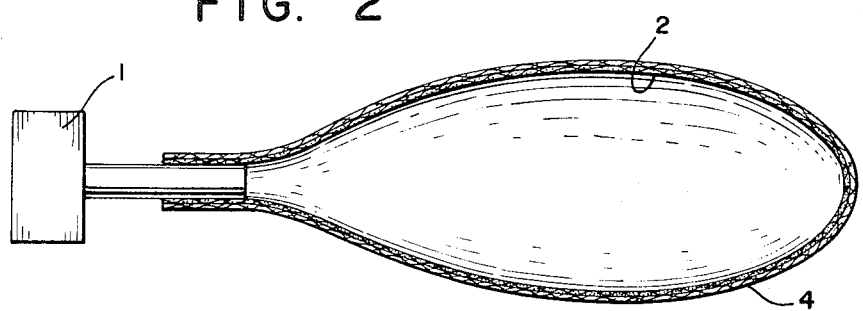

Describing in further detail in relation to the drawings:

FIG. 1 shows the embodiment of the invention in which an energy absorbing expandable inner bag located within the passenger restraint outer bag just before full inflation; and FIG. 2 is a second embodiment of the invention at full inflation.

According to the invention, an inflating medium is obtained from a source 1, as is well known in the art. For example, the inflating medium is gas obtained from either a gas generator system or a combined compressed gas and gas generating source. The inflating medium is directed toward heat and kinetic energy absorbing bag in the form of an expandable, but not elastic, low porosity or substantially non-porous bag 2, said inner bag 2 being contained within an outer passenger restraint bag 4. All of the inflating material is directed into the inner bag 2. The temperature of the inflating medium in one embodiment, a steering wheel embodiment, in an outer bag without the inner bag is in the range of 250° to 350°F., but with the inclusion of a fiber glass inner bag, in one embodiment, which may be woven, is reduced to about 150°F., the bags in that embodiment having a volume when filled of about 2 cu. ft. Other heat absorbing materials, such as nylon fabric coated with aluminumized neoprene, may also be utilized for the inner bag, but fiber glass is preferable and especially advantageous since it provides good heat absorbing qualities while having the strength to absorb kinetic energy of gas filling the bag.

The inner bag will expand on filling, absorbing the energy of the inflating material entering thereinto, and move in a direction so as to conform to the space of the outer bag as it expands toward it. The volume of the inner bag is just less than the volume of the outer bag when fully expanded, as shown in FIG. 2. The outer bag 4 may be formed of suitable material, such as nylon.

We claim:

1. Inflatable restraint system comprising a source of inflating gas, an outer bag of predetermined volume when fully inflated, an independent and expandable, but inelastic, heat and kinetic energy absorbing inner bag of smaller volume than the outer bag when fully inflated independent of and located in said outer bag, means for introducing all of the inflating gas directed toward the outer bag into said inner bag to expand said inner bag, said inner bag conforming to the shape of said outer bag when said gas is introduced thereinto and of just less than the same volume as the outer bag when both are fully expanded by said gas, said inner bag being formed of nylon fabric coated with aluminized neoprene.

2. Inflatable restraint system comprising a source of inflating gas, an outer bag of predetermined volume when fully inflated, an expandable, but inelastic, kinetic energy absorbing inner bag of smaller volume than the outer bag when fully inflated independent of and located in said outer bag, heat absorbing fiber glass material included in said inner bag, means for introducing all of the inflating gas directed toward the outer bag into said inner bag to expand said inner bag, said inner bag conforming to the shape of said outer bag when said gas is introduced thereinto and of just less than the same volume as the outer bag when expanded by said gas.

* * * * *